United States Patent [19]
Wanless

[11] 3,922,218
[45] Nov. 25, 1975

[54] HYDROCARBON SEPARATION PROCESS

[75] Inventor: Gordon James Wanless, Lightwater, England

[73] Assignee: The British Petroleum Company Limited, London, England

[22] Filed: July 22, 1974

[21] Appl. No.: 490,483

[30] Foreign Application Priority Data
July 26, 1973 United Kingdom............... 35614/73

[52] U.S. Cl. ........................ 208/310; 260/676 MS
[51] Int. Cl.² ........................................ C10G 25/04
[58] Field of Search ............... 208/310; 260/676 MS

[56] References Cited
UNITED STATES PATENTS
3,428,552  2/1969  Turnbull et al..................... 208/310

*Primary Examiner*—Herbert Levine
*Attorney, Agent, or Firm*—Morgan, Finnegan, Pine, Foley & Lee

[57] ABSTRACT

In a molecular sieve process for the separation of n-paraffins boiling in the gasoline range desorption of the n-paraffins from the bed is effected by means of an ejector. Preferably the motive fluid supplied to the ejector is recycled n-paraffin product.

13 Claims, 1 Drawing Figure

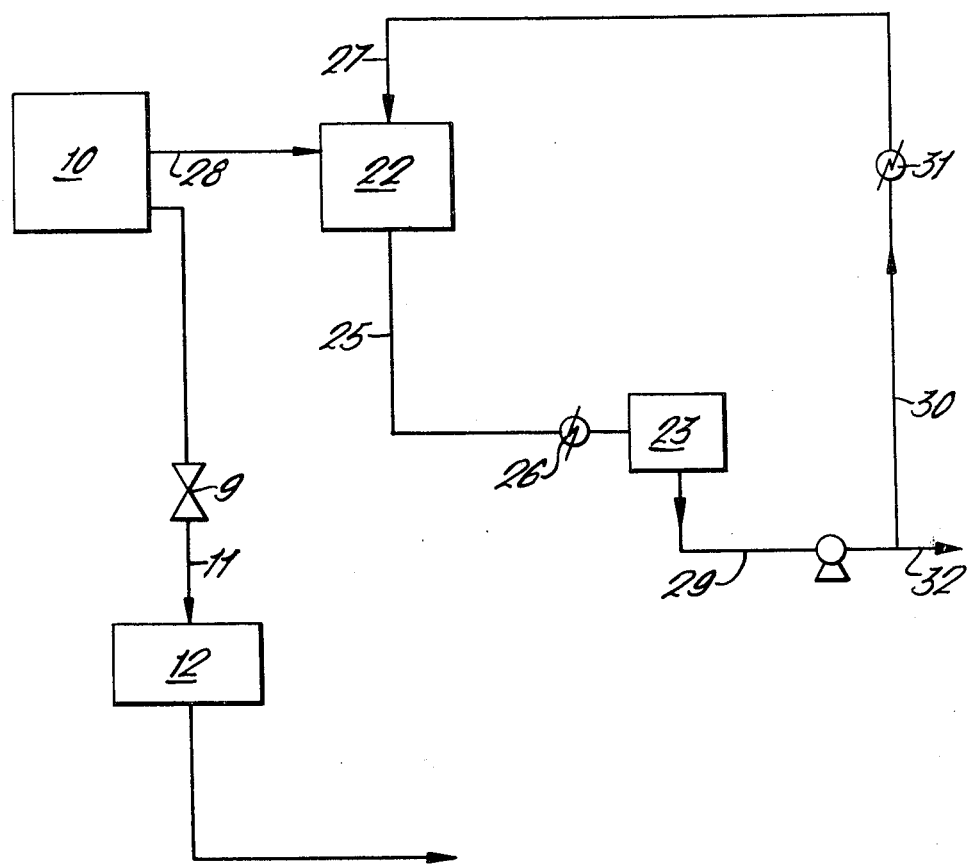

HYDROCARBON SEPARATION PROCESS

This invention relates to a cyclic process for the separation of n-paraffins from mixtures thereof together with non straight chain hydrocarbons, e.g. aromatics, cycloparaffins and isoparaffins, using a bed of 5A molecular sieve.

The separation of n-paraffins from straight chain hydrocarbons, especially cycloparaffins and/or isoparaffins using a 5A molecular sieve has been previously described, e.g., in British Patent Specification No. 1,026,116 which claims a process for separating straight-chain hydrocarbons from mixtures of the same with branched chain and/or cyclic hydrocarbons, the mixtures boiling within the range $C_4$-450°C, comprising contacting the mixture with a fixed bed of 5A molecular sieve in a first stage selectively to adsorb the straight chain hydrocarbons, purging the sieve bed in a second stage to remove surface adsorbed and interstitially held hydrocarbons from the sieve bed, and desorbing the adsorbed straight-chain hydrocarbons in a third stage, all three stages being conducted isothermally in the vapour phase, purging and desorption being effected by pressure variation alone.

In such a process only the n-paraffins are able to enter the pores of the sieve, i.e., be adsorbed, and when the feed mixture is passed over the bed of the sieve the branched chain and cyclic components come out in the effluent and the n-paraffins are adsorbed. The n-paraffins are subsequently removed in a separate stage called a desorption stage.

One method by which the n-paraffins can be desorbed is by pressure reduction and it has been proposed in British Patent Specification No. 1,110,949 to effect the pressure reduction by directly condensing the effluent vapours from the adsorbent bed with a quench liquid. A convenient and preferred method of quenching is to pass the effluent vapours up a condenser tower down which the quench liquid is caused to flow and to use a portion of the liquid drawn off from the base of the condenser tower as the quench liquid. However, when the effluent vapours are hydrocarbons in the gasoline range, in order to get a low enough pressure to effect the desorption it is necessary to cool the recycling liquid below ambient temperature. This involves a large capital and operating cost for refrigeration plant and it is an object of the present invention to avoid this disadvantage.

A process has now been devised in which the pressure reduction for the desorption stage is effected by means of an ejector.

Ejectors are known per se and are jet pumps which use either gas or liquid for either motive or entrained fluid and discharge at a pressure intermediate between the motive pressure and the suction pressure. Jet pumps are described in the Chemical Engineers Handbook, 4th Edition (1963) by John H. Perry pps 6–13 and 6–15.

An ejector consists of three basic parts: a motive jet nozzle, a suction chamber and a mixing diffuser. A fluid called the "motive fluid" is supplied to the nozzle at constant pressure and expands with increasing entropy, decreasing enthalpy, increasing specific volume and increasing velocity. The motive and entrained fluids mix in a near isobaric process with increasing entrained fluid velocity and decreasing motive fluid velocity. The combined mixture then passes through the diffuser where velocity energy is converted into pressure energy.

The motive fluid can be in either the liquid or gaseous state though preferably the latter.

Thus, according to the present invention, there is provided a process for the separation of n-paraffins boiling in the gasoline range from a mixture thereof with non straight chain hydrocarbons which process comprises passing the mixture through a bed of 5A molecular sieve in an adsorption stage, recovering an effluent of reduced n-paraffin content and desorbing the n-paraffins from the molecular sieve in a desorption stage, wherein the desorption is effected by reducing the pressure in the bed by means of an ejector using, as motive fluid, recycled n-paraffin product.

In the present specification the term gasoline has its normal meaning as used in the petroleum industry, i.e., it refers to fractions boiling substantially within the ranges 30° to 200°C.

A purge stage can be interposed between the adsorption and desorption stages to remove surface adsorbed and interstitial material, purging being effected by reducing the pressure in the bed by direct contact condensation of the purge effluent vapours using, as quench liquid, recycled purge effluent.

Since the motive fluid is recycled n-paraffin product, subsequent separation is avoided in a process according to the present invention.

Suitable operating conditions for the process are as follows:

| Adsorption Stage | Broad Range | Preferred Range |
| --- | --- | --- |
| Temperature(°C) | 300 to 450 | 325 to 375 |
| Pressure(psia) | 3 to 200 | 80 to 160 |
| Time(minutes) | 1 to 5 | 2 to 4 |
| Purge Stage | | |
| Temperature(°C) | 300 to 450 | 325 to 375 |
| Pressure(psia) | 0.1 to 25 | 2 to 20 |
| Time(minutes) | ≯3 | 0.5 to 2 |
| Desorption Stage | | |
| Temperature(°C) | 300 to 450 | 325 to 375 |
| Pressure(psia) | 0.05 to 2 | 0.2 to 2 |
| Time(minutes) | 1 to 10 | 1 to 5 |

It is to be understood that during the adsorption stage, pressure is increasing and the quoted figures relate to the maximum pressure achieved at the end of the stage. The initial pressure may well be outside even the broad range.

Conversely, during purging and desorption, pressure is decreasing and the quoted figures relate to the minimum pressure achieved at the end of each stage. Again, the initial pressures may well be outside the broad ranges.

The preferred purge pressure for any feedstock depends upon the actual boiling range of the feedstock. For example when treating a gasoline boiling in the range 30° to 180°C and having an average carbon number of 7, a purge pressure of 2 to 10 psia is preferred and when treating a $C_5/C_6$ gasoline a purge pressure of 5 to 20 psia is preferred.

Similarly, the preferred adsorption and desorption pressures vary according to the feedstock boiling range.

The amount of motive fluid in relation to the amount of desorbate will depend on a number of factors, e.g., the composition of the desorbate, the composition of the motive fluid and the temperature and pressure of the motive fluid at the inlet to the ejector. Usually it will be in the ratio 3:1 to 20:1.

The process is particularly suitable for use in combination with a hydrocarbon isomerisation process. For example, the n-paraffins obtained as a product from the desorption stage may be subjected to an isomerisation process to convert them to isoparaffins and the isomerisate then recycled to the adsorption stage. Alternatively the feedstock mixture containing n-paraffins may be obtained from an isomerisation process and the n-paraffins obtained as effluent from the desorption stage can be recycled to the isomerisation process.

The preparation and use of a suitable isomerisation catalyst is described in British Patent Specification No. 953187 which claims a method of preparing a catalyst, suitable for the isomerisation of $C_4$ and higher paraffin hydrocarbons in the gasoline boiling range at temperature below 400°F, comprising contacting a hydrogen-containing alumina with a compound of general formula

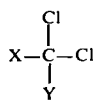

(where X and Y may be the same or different and selected from H, Cl, Br, F or SCl, or where X and Y together may be O or S) under non-reducing conditions at a temperature such that chlorine is taken up by the alumina without the production of free aluminium chloride.

The invention illustrated by the following Examples:

EXAMPLE 1

A feedstock having the following composition is treated using the scheme shown in the drawing.

| n-Paraffins | Feed Composition (% vol) Iso-paraffins | Cycloparaffins | |
|---|---|---|---|
| propane | 0.4 isobutane | 1.5 cyclopentane | 1.4 |
| n-butane | 1.8 isopentane | 36.8 methylcyclopentane | 1.1 |
| n-pentane | 12.1 2,2-dimethylbutane | 15.8 cyclohexane | 1.2 |
| n-hexane | 4.1 2,3-dimethylbutane | 4.3 | |
| | 2-methylpentane | 12.6 | |
| | 3-methylpentane | 6.9 | |

The feed containing 18.4% wt n-paraffins, 77.9% isoparaffins, 3.7% wt cycloparaffins and no aromatics is passed to a double bed of molecular sieve 10, each bed containing 11 tons of 5A molecular sieve. Normal paraffins are adsorbed and non normals passed out through valve 9, line 11 and drum 12 as one product. One of the beds 10 is then purged and desorbed under the conditions given in Table 1. The purge is effected by direct contact condensation using condensed purge effluent as the quench liquid and the desorption is effected by connecting the outlet 28 of the bed to a gas/-gas ejector 22 through which is passed recycled normal paraffin product.

The motive fluid fed to the inlet of the ejector 22 is recycled n-paraffin product, at a temperature of 360°C and pressure 165 psia which is admitted to the ejector 22 via line 27. The beds are connected to ejector 22 by line 28 and n-paraffins are withdrawn from the beds at a temperature of 360°C.

Material at a temperature of (ca) 360°C and pressure of 15 psia is withdrawn from the base of the ejector 22 via line 25 at a rate of 143,940 lb/hr and passed to condenser 26 (where it is cooled to 49°C at 15 psia and admitted to receiver 23.).

A liquid containing n-paraffin product and condensed n-paraffin motive fluid is withdrawn from receiver 23 via line 29 at a rate of 143,940 lb/hr and 132,000 lb/hr of the mixture passed via line 30 to vaporiser 31 where it is heated to 360°C and passed back to the ejector 22. Heat exchange is effected between condenser 26 and vaporiser 31. 11,940 lbs/hr of n-paraffins are obtained as product from line 32.

The process is operated under the following conditions:

| | |
|---|---|
| Overall cycle time | 360 seconds |
| Cyclic yield to desorption condenser | 2.42% sieve wt. |
| Adsorption Stage | |
| Temperature | 360°C |
| Pressure at beginning of feed | 60 mm Hg |
| Pressure at end of feed | 89.7 psia |
| Feed rate | 114,580 lbs/hr |
| Duration | 180 seconds |
| Purge Stage | |
| Temperature | 360°C |
| Pressure at beginning of purge | 89.7 psia |
| Pressure at end of purge | 600 mm Hg |
| Duration | 47 seconds |
| Desorption Stage | |
| Temperature | 360°C |
| Pressure at beginning of desorption | 600 mmHg |
| Pressure at end of desorption | 60 mm Hg |
| Duration | 117 seconds |

EXAMPLE 2

A catalytic reformate feedstock having the following composition was treated, again using the scheme shown in the drawing.

| Feed Composition (% vol) | |
|---|---|
| n-Paraffins | 20.69 |
| Isoparaffins | 37.36 |
| Cycloparaffins | 2.00 |
| Aromatics | 38.87 |
| Olefins | 1.08 |

The carbon number range of the feedstock was $C_{7-9}$.

Referring to the drawing, desorption effluent at a temperature of 360°C is passed from bed 10 to ejector 22 via line 28. The motive fluid fed to the inlet of ejector 22 via line 27 is recycled n-paraffin product at a temperature of 360°C and a pressure of 169 psia and a rate of 65 litres/hour (which is equivalent to 104 lbs). Material at a temperature of about 360°C and 15 psia is withdrawn from the base of the ejector via line 25 at a rate of 67 litres/hour and passed to condenser 26 where it is cooled to 49°C and 15 psia. Of 107 lbs/hr of the condensed n-paraffins from the condenser 3 lbs/hr are removed as product and 104 lbs/hr are recycled to be used as motive fluid.

The process was operated under the following conditions:

| | |
|---|---|
| Overall cycle time | 315 seconds |
| Cyclic yield to desorption condenser | 1.81% sieve weight |
| Adsorption Stage | |
| Temperature | 360°C |
| Pressure at beginning of feed | 60 mm Hg |
| Pressure at end of feed | 169 psia |
| Feed rate | 26.5 lb/hr |
| Duration | 135 seconds |
| Purge Stage | |
| Temperature | 360°C |
| Pressure at beginning of purge | 169 psia |
| Pressure at end of purge | 760 mm Hg |
| Duration | 90 seconds |
| Desorption Stage | |
| Temperature | 360°C |
| Pressure at beginning of desorption | 760 mm Hg |
| Pressure at end of desorption | 60 mm Hg |
| Duration | 90 seconds |

The denormalised material contains less than 4% n-paraffins. The material obtained from the condenser contains 94.5% n-paraffins.

I claim:

1. A process for the separation of n-paraffins boiling in the gasoline range from a mixture thereof with non-straight chain hydrocarbons which process comprises passing the mixture through a bed of a 5A molecular sieve in an adsorption stage, recovering an effluent of reduced n-paraffin content and desorbing the n-paraffin from the molecular sieve in a desorption stage, wherein desorption is effected by passing desorbed n-paraffin product through an ejector using recycled n-paraffin product as motive fluid so as to reduce the pressure in the bed.

2. A process according to claim 1 wherein a purge stage to remove surface adsorbed and interstitial material is interposed between the adsorption and desorption stages, purging being effected by reducing the pressure in the bed by direct contact condensation of the purge effluent vapours using, as quench liquid, recycled purge effluent.

3. A process according to claim 1 wherein the temperature employed in each stage is in the range 300° to 450°C.

4. A process according to claim 1 wherein the adsorption stage pressure lies within the range 3 to 200 psia.

5. A process according to claim 2 wherein the purge stage pressure lies within the range 0.1 to 25 psia.

6. A process according to claim 1 wherein the desorption stage pressure lies within the range 0.05 to 2 psia.

7. A process according to claim 1 wherein the adsorption period is in the range 1 to 5 minutes.

8. A process according to claim 2 wherein the purge period is not greater than 3 minutes.

9. A process according to claim 1 wherein the desorption period is in the range 1 to 10 minutes.

10. A process according to claim 1 wherein the motive fluid is employed in the gaseous phase.

11. A process according to claim 1 wherein the molar ratio of motive fluid to desorbate is in the range 3:1 to 20:1.

12. A process according to claim 1 wherein the n-paraffins obtained as a product from the desorption stage are subjected to an isomerisation process to convert n-paraffins to isoparaffins and the isomerised product is fed to the adsorption stage.

13. A process according to claim 1 wherein the mixture containing n-paraffins is obtained as the product from an isomerisation process and the n-paraffins obtained as effluent from the desorption stage are recycled to the isomerisation process.

* * * * *